April 26, 1955     H. M. STRONG     2,706,911
HEAT CONDUCTIVITY MANOMETER
Filed July 19, 1952
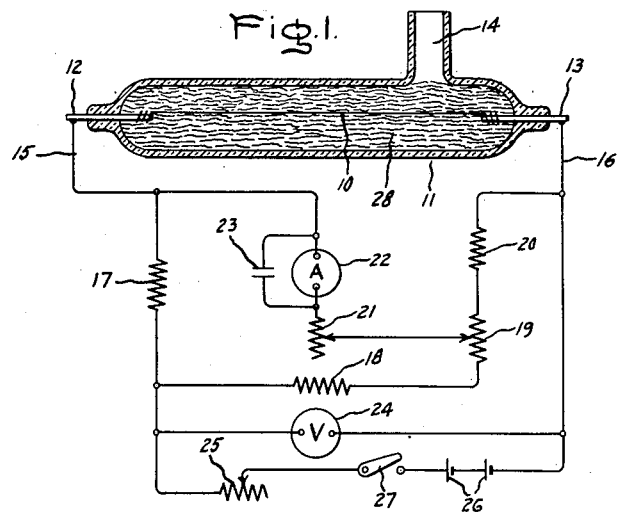
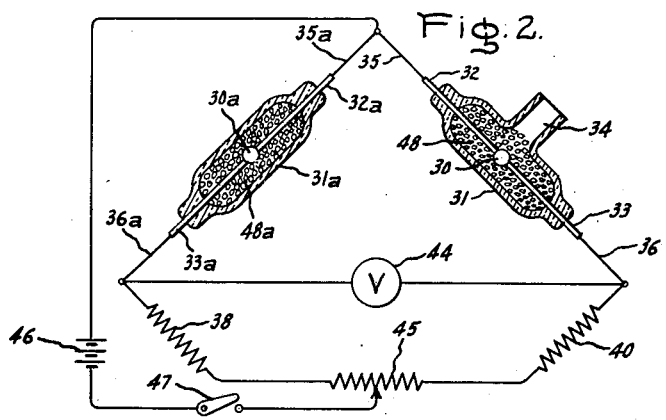
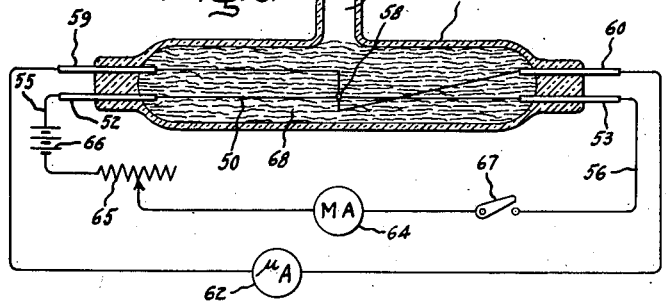
Inventor:
Herbert M. Strong,
by Paul A. Frank
His Attorney.

United States Patent Office 2,706,911
Patented Apr. 26, 1955

2,706,911

HEAT CONDUCTIVITY MANOMETER

Herbert M. Strong, Schenectady, N. Y., assignor to General Electric Company, a corporation of New York Application July 19, 1952, Serial No. 299,830

8 Claims. (Cl. 73—399)

This invention relates to vacuum gages of the heat-conductivity type; more particularly, it relates to such gages which can measure the pressure over a wider range than heat conductivity vacuum gages previously known in the art.

Heat conductivity manometers such as thermocouple, thermistor, and Pirani gages are widely utilized for measuring pressures from about 0.5 mm. Hg down to about 0.001 mm. Hg. Thermal conductivity gages have a filament which may be heated and they measure the pressure within a vessel to which the heated filament has access by making use of the fact that below a pressure of 1 mm. Hg the thermal conductivity of a gas is almost entirely dependent on the pressure of the gas. Above a pressure of about 0.5 mm. Hg, the gas pressure reaches a point where the molecular mean free path of the gas molecules is much shorter than the free space inside the heat conductivity gage itself. When this occurs the thermal conductivity of the gas becomes independent of the pressure and the gage ceases to be sensitive to pressure changes.

It is an object of this invention to provide a heat conductivity manometer which is sensitive to pressure changes within a range of 0.001 mm. Hg to above 1 mm. Hg.

It is another object of this invention to provide a pressure gage of the heat conductivity type wherein the dependency of thermal conductivity on pressure extends to well above 1 mm. Hg.

It is a further object of this invention to provide a vacuum gage of the heat conductivity type which can measure pressures within the range of 1 mm. Hg to above 10 mm. Hg.

Briefly stated, in accordance with one aspect of my invention, I surround the filament of a heat conductivity vacuum gage with a packing composed of a high melting electrically insulating solid in the form of granules or fibers whereby a large proportion of the volume occupied by the solid consists of interstitial space.

The three principal species of heat conductivity vacuum gages are the Pirani, the thermistor, and the thermocouple. In Fig. 1, my invention is illustrated with reference to a Pirani type gage; in Fig. 2, it is illustrated with reference to a thermistor type gage; and in Fig. 3 it is illustrated with reference to a thermocouple type gage.

Referring to Fig. 1, the Pirani gage consists of a filament 10 positioned in a container 11, by means of a pair of electrodes 12 and 13 passing through the container 11 in gas-tight engagement. The container 11, which is normally composed of glass but which may just as readily be composed of other materials of construction, has an opening 14 adapted for attachment to a vessel (not shown) having a low interior pressure which it is desired to measure. The space within the container 11 surrounding the filament 10 is filled with a packing 28 of electrically insulating material such as glass fibers.

The Pirani gage is incorporated by means of leads 15 and 16 in a Wheatstone bridge circuit consisting of a temperature compensation resistor 17, or another Pirani gage like #11 except that it is thoroughly evacuated and sealed, having a high thermal coefficient of resistance which varies in such a way as to compensate for the effects of ambient temperature on the Pirani gage, a resistor 18 having a resistance of about 350 ohms, a 100-ohm potentiometer 19, a 3500-ohm resistor 20, a 500-ohm potentiometer 21, a microammeter 22 capable of measuring currents up to 200 microamps., a 200-mfd. capacitor 23 shunting the ammeter 22, a voltmeter 24, a 10-ohm potentiometer 25, a pair of #6 dry cells 26, and a switch 27.

While ratings have been given for the various elements of the above circuit, it is obvious that these are not critical and may be varied considerably without interfering with the satisfactory functioning of the device.

In operating the vacuum measuring instrument of Fig. 1, the potentiometer 25 is set to give a standard voltage across the bridge circuit. The potentiometers 19 and 21 are set to compensate for variations between gages. For any one gage these settings will be permanent. At zero pressure no current flows in the microammeter 22. Then as the pressure on the gage tube is raised, the current through the microammeter varies with pressure. If the packing 28 is omitted the current through the microammeter varies fairly linearly over the range of pressure from 0 to 100 microns Hg. At about 400 or 500 microns Hg the curve levels off and there is no further increase in current with increase in pressure.

In order to provide an instrument having a much wider range of current variation with pressure variation, I surround the filament 10 with the packing 28 of a high melting electrically insulating solid which defines a large proportion of interstitial space. Such a packing may be granular or may be in the form of a mineral insulating fiber. Suitable materials for this purpose are fibers prepared from glass, quartz, slag wool, alumina, and asbestos as well as granular materials such as crushed glass, dry silica sand, finely divided ceramic materials, as well as electrically insulating salts having a melting point above the temperature of the filament 10. The effect of such packing within the container 11 and surrounding the filament 10 is that a much shorter mean free path must be attained before the gas molecules have a free path that is substantially less than the interstitial space between the individual strands or particles of packing material. The range of the packed gage is dependent on the particle size and density of the packing 28, smaller particle size and higher density increasing the upper limit of pressure range.

A gage having the packing material 28 will give a fairly linear variation of current with pressure up to a pressure as great as 10 or 15 mm. of mercury.

Fig. 2 illustrates my invention applied to a vacuum measuring instrument utilizing a thermistor gage. A thermistor element 30 consists of a small bead of a semiconducting material which is connected to a pair of leads 32 and 33 sealed into a container 31 which may conveniently be composed of glass. An opening 34 from the container 31 is adapted for connection to a low pressure atmosphere which it is desired to measure. In the circuit illustrated a second thermistor is used having characteristics matched to the thermistor already described so that the two gages may be operated in adjacent arms of a Wheatstone bridge. The second gage is the same as the first except that the opening corresponding to the opening 34 is omitted. In the second gage the parts are numbered the same as in the first gage except that the subscript "a" has been added. The gage not connected to the device which is having its pressure determined serves as a temperature compensator for the gage actually utilized in measuring pressure. Both gages have the space surrounding the semi-conductor 30 in the container 31 filled with granules 48 of crushed glass. The other elements illustrated in the circuit of Fig. 2 consist of a resistor 38 of about 2000 ohms resistance, a potentiometer 45 of about 1000 ohms resistance, a resistor 40 of about 2000 ohms resistance, a 9-volt battery 46, a voltmeter 44 having a meter resistance of about 10,000 ohms and a meter range of about 1 to 2 volts, and a switch 47. As one skilled in the art will readily apprehend, the ratings given for the various elements are representative only and may be widely varied without interfering with the satisfactory operation of the measuring instrument. For example, the element 46 does not need to supply direct current as the device will just as readily operate on alternating current. The resistors 38 and 40 should have the same value but may vary considerably from the 2000 ohms resistance set forth above.

In operation, the bridge is balanced under conditions of good vacuum and the off-balance current then becomes a measure of the pressure. If the crushed glass granules 48 are absent from the gages, the increase of current with pressure is almost linear over a range of pressures from 1 micron of mercury to about 1000 microns of mercury. The presence of the crushed glass granules 48 increases the upper limit to about 15,000 microns Hg, or 15 mm. Hg.

Fig. 3 illustrates a thermocouple gage utilizing my invention. In this case the gage consists of a filament 50 positioned in a container 51 which, as in the case of the devices of Figs. 1 and 2, is preferably composed of glass. The filament 50 is connected to electrodes 52 and 53 which extend through the container 51 in gas-tight engagement. At the center of the filament 50 a thermocouple 58 is welded and connected to electrodes 59 and 60 extending through the container 51 in a gas-tight sealed engagement. The container 51 includes an opening 54 adapted for connection to a device (not shown) having a low pressure which it is desired to measure.

The space within the container 51 surrounding the filament 50 is packed with aluminum oxide fibers 68 in a manner similar to the packing 28 of the Pirani gage of Fig. 1 and the packing 48 of the thermistor gage of Fig. 2. The filament 50 is connected by means of leads 55 and 56 to a heating circuit consisting of a battery 66, a rheostat 65, a milliammeter 64 and a control switch 67. The thermocouple 58 is connected to a microammeter 62. In operation, the switch 67 is closed and the rheostat 65 is set to pass a current of approximately 0.030 to 0.050 amp. depending on the range of pressures to be measured. This current is sufficient to heat the plate or filament 50 normally used to a temperature varying from 100° C. to 200° C. The temperature of the filament 50 may be read at the microammeter 62 which, if desired, may be arranged to read temperature rather than current. At low pressures the temperature of the filament 50 increases with decrease in pressure in a relationship which is almost linear up to about $\frac{1}{10}$ of a millimeter provided the packing 68 is omitted. The range of a thermocouple gage having the container 51 packed with aluminum oxide fibers 68 in accordance with this invention is extended to about 5 mm. Hg before the relationship between filament temperature and pressure ceases to be linear.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A vacuum gage comprising a filament, a container in which said filament is positioned, a packing in said container surrounding said filament, said packing being composed of a high melting electrically insulating gas permeable solid having a large proportion of interstitial space, and means for connecting the interior of said container to a source of vacuum to be measured.

2. A vacuum measuring instrument comprising a filament, a container in which said filament is positioned, a packing in said container surrounding said filament, said packing being composed of a high melting electrically insulating gas permeable solid having a large proportion of interstitial space, means for connecting the interior of said container to a source of vacuum to be measured, means for heating said filament, and means for measuring the electrical characteristics of said filament under varying conditions of pressure within said container.

3. A vacuum gage comprising a filament, a container in which said filament is positioned, a packing of mineral fibers in said container surrounding said filament, and means for connecting the interior of said container to a source of vacuum to be measured.

4. A vacuum gage as claimed in claim 3 wherein the mineral fibers are composed of glass.

5. A vacuum gage comprising a filament, a container in which said filament is positioned, a packing of electrically insulating granular material in said container surrounding said filament, and means for connecting the interior of said container to a source of vacuum to be measured.

6. A vacuum measuring instrument comprising a filament, a container in which said filament is positioned, a packing of mineral fibers in said container surrounding said filament, means for connecting the interior of said container to a source of vacuum to be measured, an electric circuit for heating said filament, and means for measuring the electrical characteristics of said filament under varying conditions of pressure within said container.

7. A vacuum measuring instrument as claimed in claim 6 wherein the mineral fibers are composed of glass.

8. A vacuum measuring instrument comprising a filament, a container in which said filament is positioned, a packing of electrically insulating granular material in said container surrounding said filament, means for connecting the interior of said container to a source of vacuum to be measured, an electric circuit for heating said filament, and means for measuring the electrical characteristics of said filament under varying conditions of pressure within said container.

References Cited in the file of this patent

UNITED STATES PATENTS

| Number | Name | Date |
|---|---|---|
| 1,365,978 | Gallager | Jan. 18, 1921 |
| 1,995,000 | Hyatt | Mar. 19, 1935 |
| 2,131,065 | Obermaier | Sept. 27, 1938 |
| 2,444,410 | Kinath | June 29, 1948 |
| 2,496,865 | Fiske | Feb. 7, 1950 |